US006577637B1

(12) United States Patent
Sieppi

(10) Patent No.: US 6,577,637 B1
(45) Date of Patent: Jun. 10, 2003

(54) METHOD, SWITCHING MEANS AND TELECOMMUNICATION SYSTEMS FOR PERFORMING DATA COMMUNICATIONS BETWEEN SUBSCRIBER STATIONS

(75) Inventor: Jukka Sieppi, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 32 days.

(21) Appl. No.: 09/212,426

(22) Filed: Dec. 16, 1998

(30) Foreign Application Priority Data

Dec. 17, 1997 (DE) .......................... 197 56 191

(51) Int. Cl.[7] .............................. H04L 12/28
(52) U.S. Cl. .................. 370/401; 370/252; 379/88.17
(58) Field of Search .................. 370/352–356, 370/277, 401, 477, 252; 704/270, 19; 379/58.17

(56) References Cited

U.S. PATENT DOCUMENTS

| | | | | |
|---|---|---|---|---|
| 5,995,923 A | * | 11/1999 | Mermelstein et al. | 704/19 |
| 6,006,189 A | * | 12/1999 | Strawczynski et al. | 704/270 |
| 6,021,136 A | * | 2/2000 | Bharucha et al. | 370/477 |

FOREIGN PATENT DOCUMENTS

| | | |
|---|---|---|
| DE | 4410952 | 11/1996 |
| DE | 195 16 078 A1 | 11/1996 |
| DE | 19541398 | 5/1997 |
| EP | 0 332 345 A2 | 9/1989 |
| WO | WO 97/29581 | 8/1997 |
| WO | 97/47127 | 11/1997 |

OTHER PUBLICATIONS

Michel Mouly et al., "The GSM System for Mobile Communications," Cell & Sys, 4 rue Elisee Reclus, F–91120 Palaiseau, France, ISBN: 2–9507190–0–7, Chapter 3, 1992, pp. 124–185.
Linden deCarmo "Internet Telephone Standards," PC Magazine, 1997, pp. 185–187.

* cited by examiner

Primary Examiner—Hassan Kizou
Assistant Examiner—John Pezzlo

(57) ABSTRACT

A switching means (BSC/MSC/VLR) of a mobile radio communication network (PLMN) contains a subscriber type determining means (SSTDM) which determines on the basis of call set-up messages whether in particular the second subscriber station (WS) of an IP-network (INTRANET) is capable of performing an audio data encoding/decoding, in particular a GSM speech encoding/decoding. The subscriber station type determining means (SSTDM) switches off an audio data encoding/decoding means (CODEC) in a base station controller (BSC) if the second subscriber station (WS) is capable of performing the speech encoding/decoding. Thus, a deterioration of the speech quality due to performing unnecessary audio data encoding/decoding is avoided and the bandwidth in the PLMN/data network can be utilized more efficiently.

17 Claims, 13 Drawing Sheets

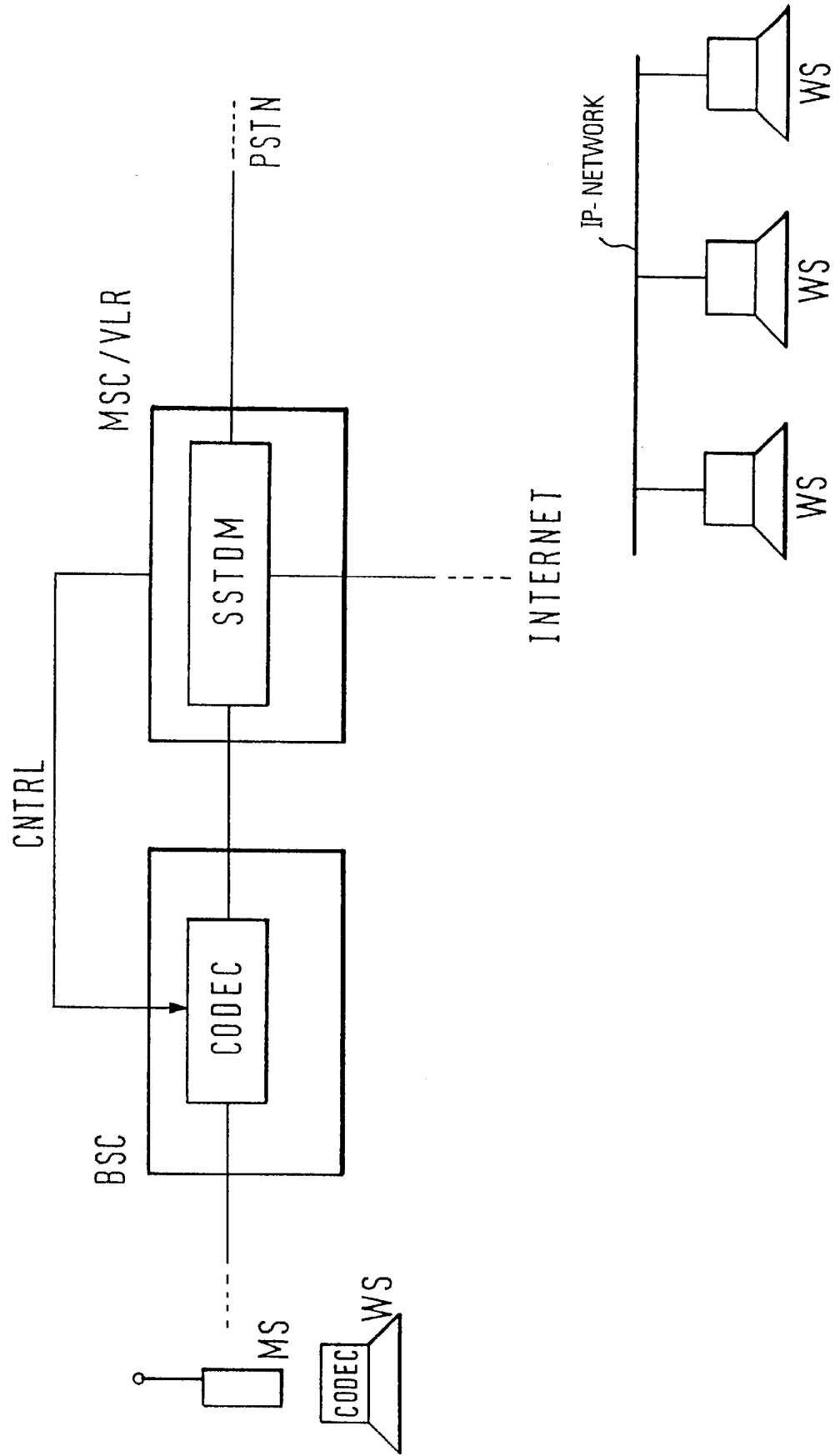
Fig. 1  PRINCIPLE OF THE INVENTION

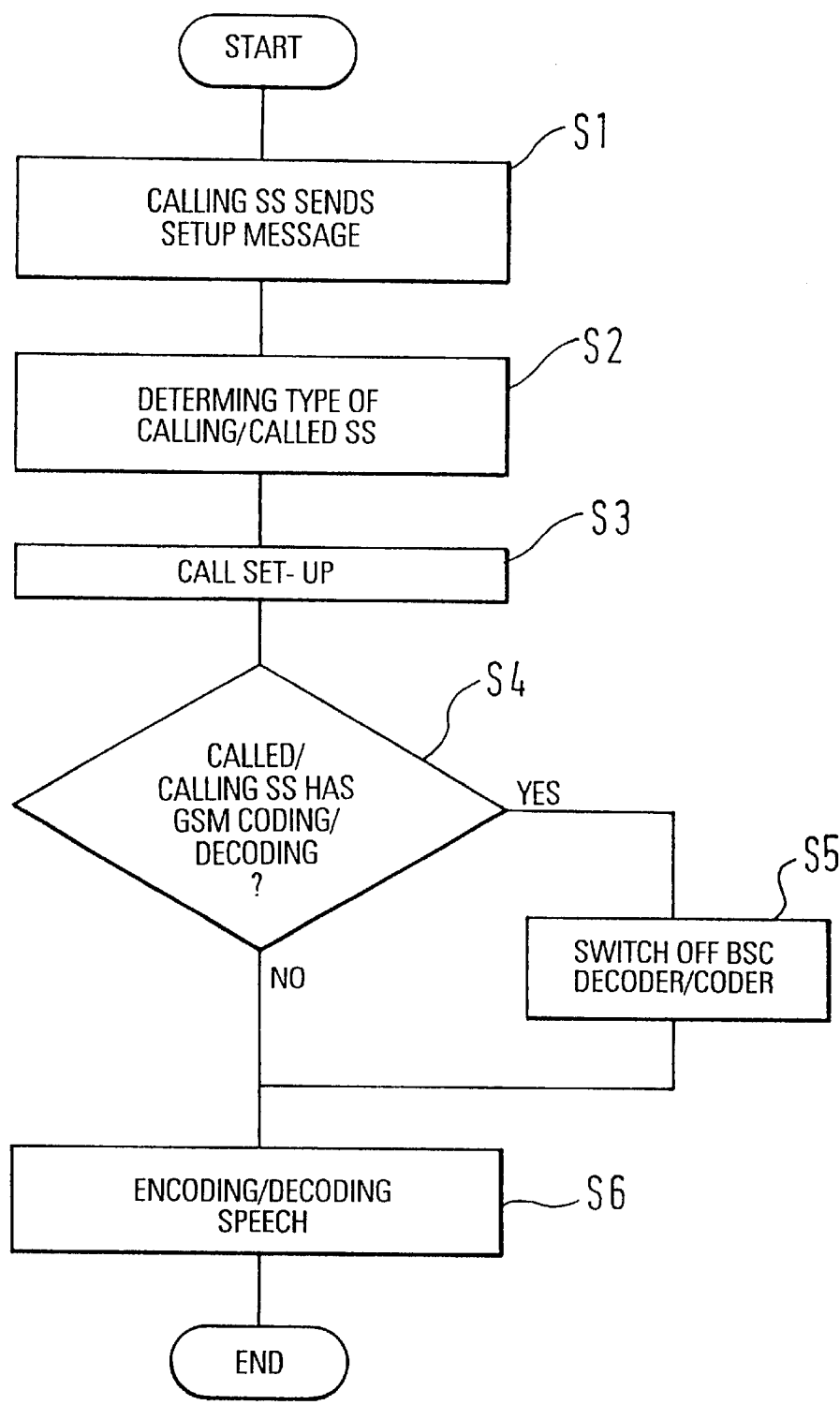
Fig. 2 PRINCIPLE OF THE INVENTION

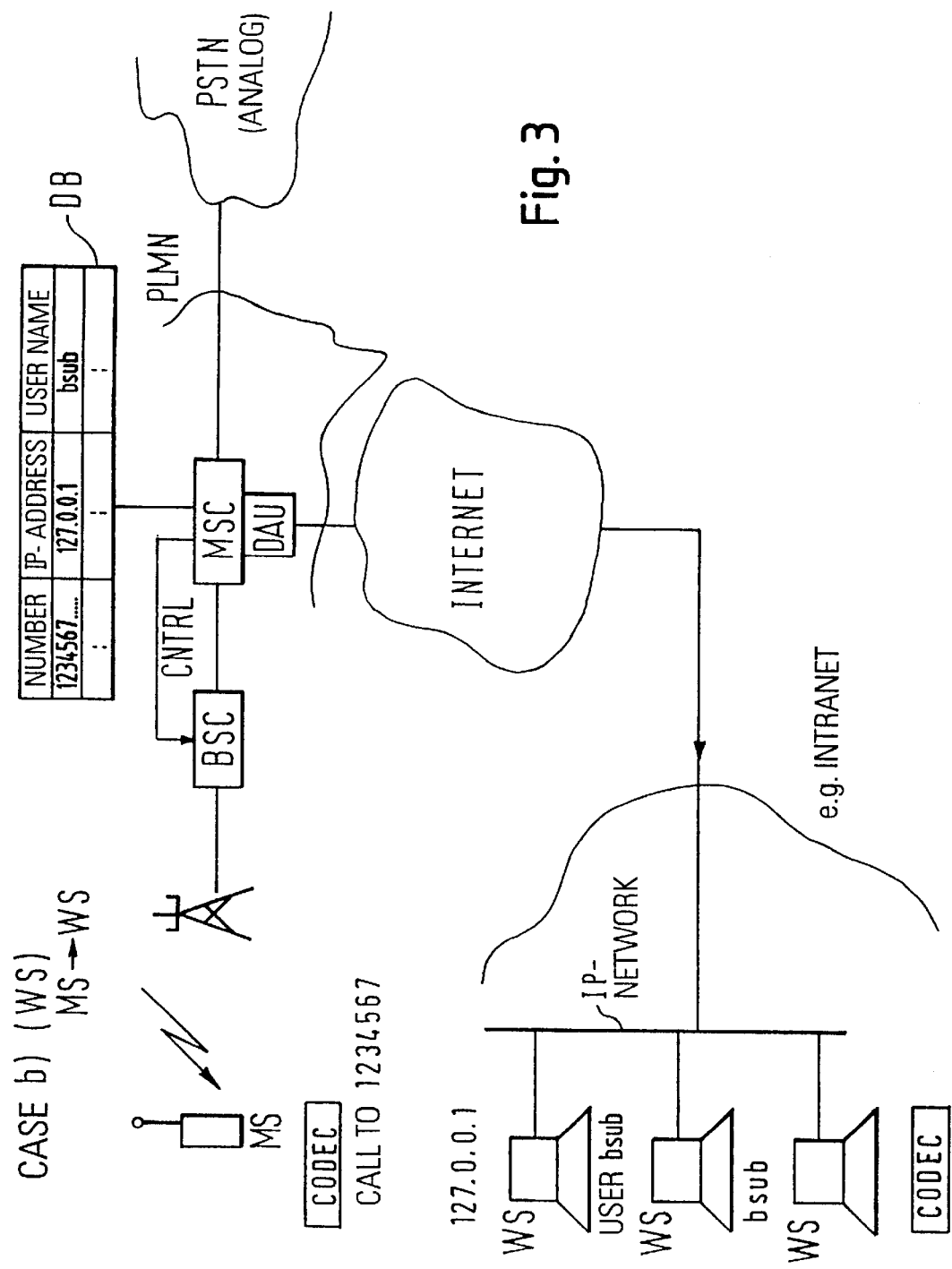

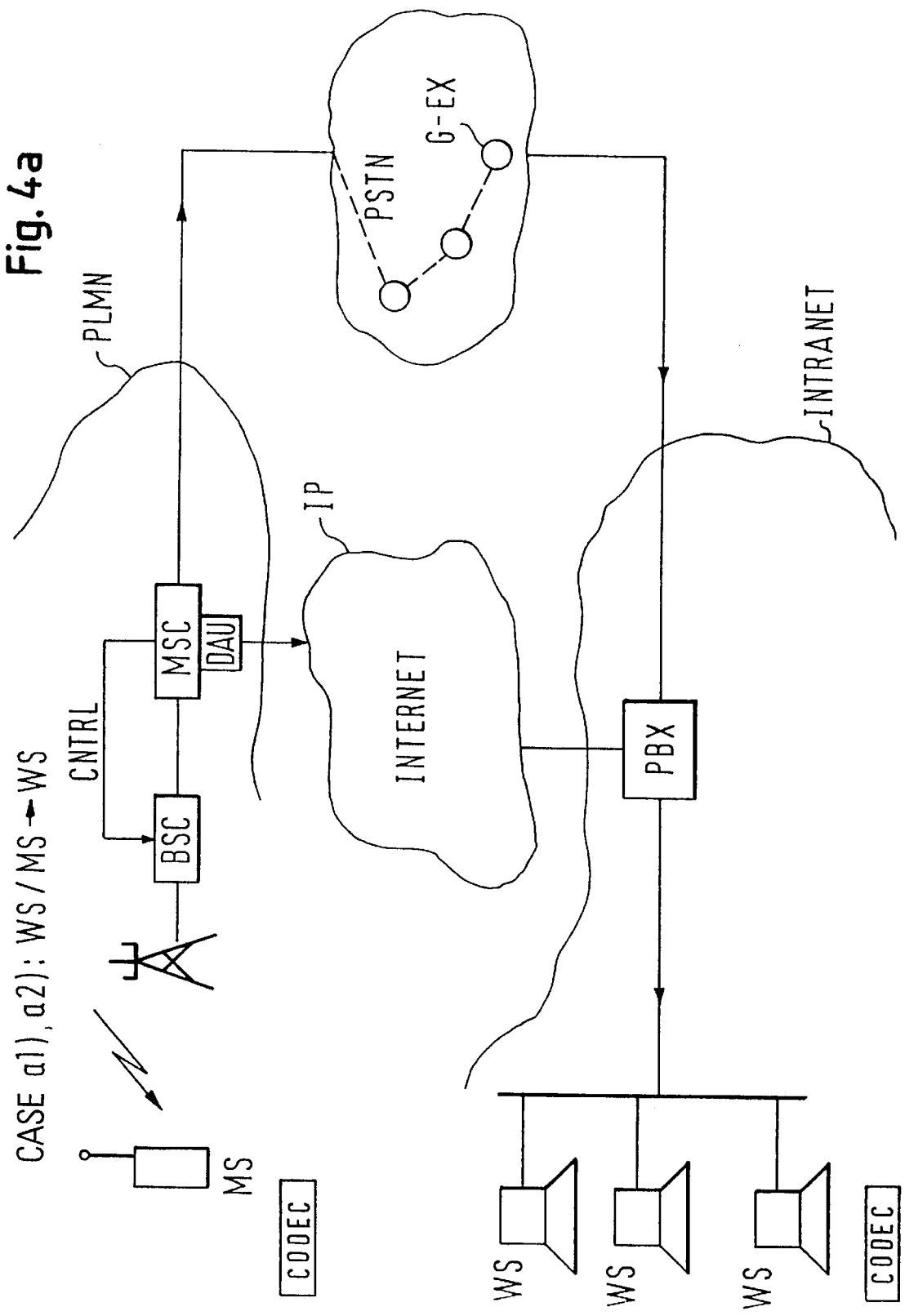

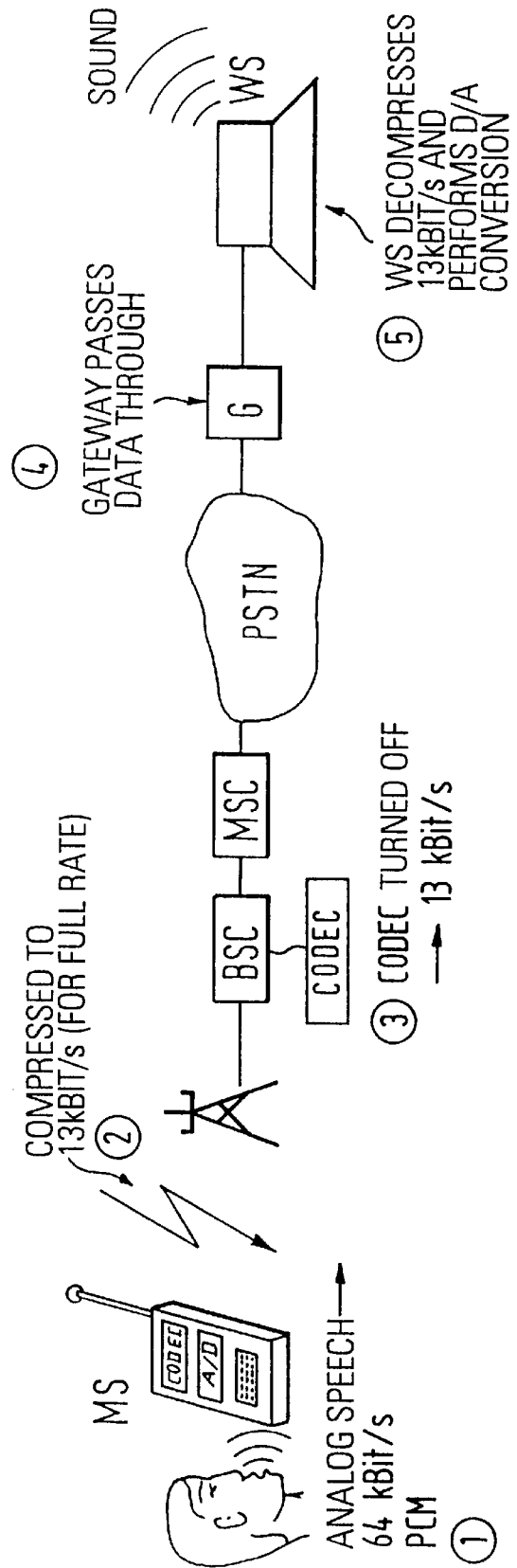
Fig. 4b  BANDWIDTH USAGE ACCORDING TO THE INVENTION
(FOR FULL RATE CODING)

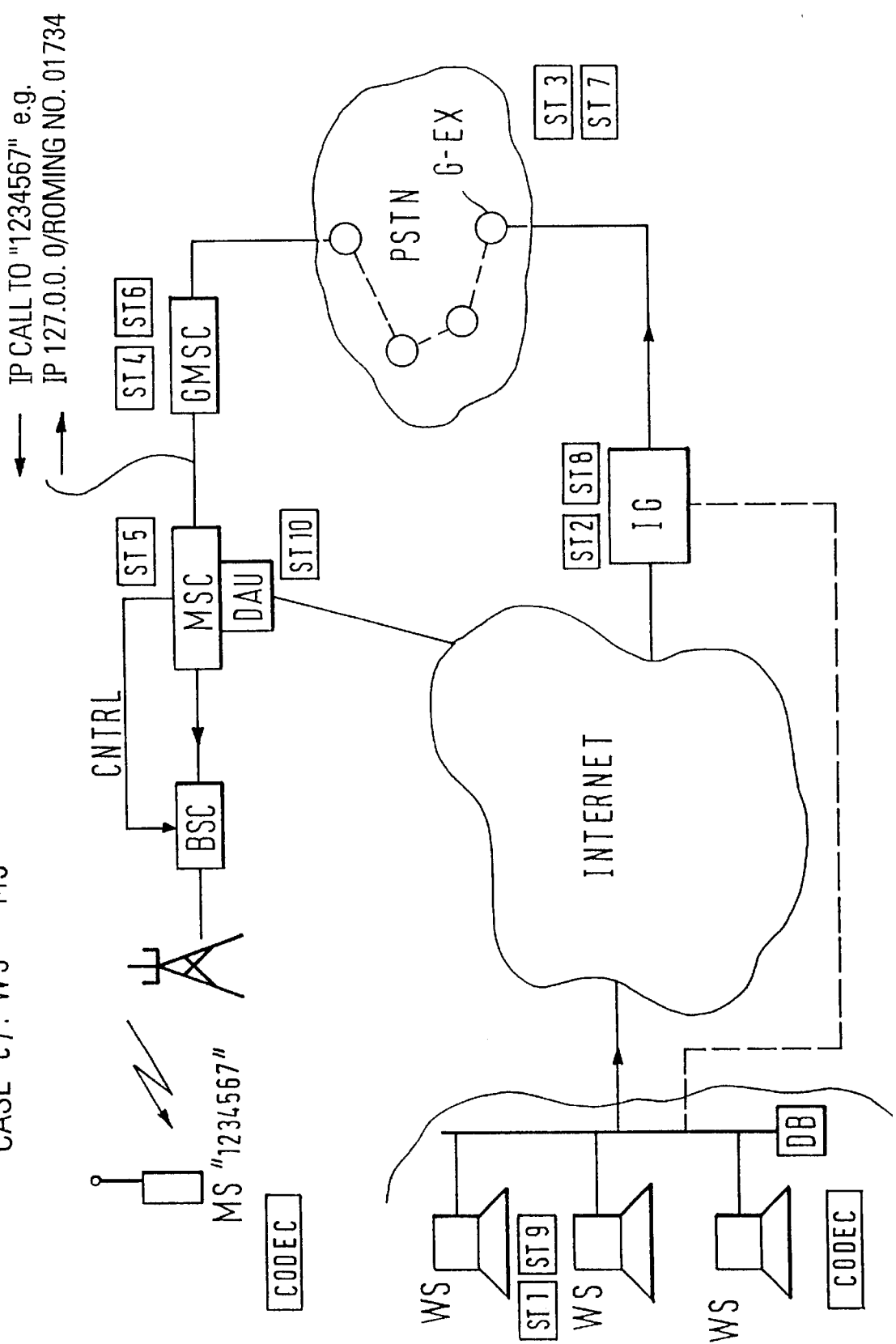

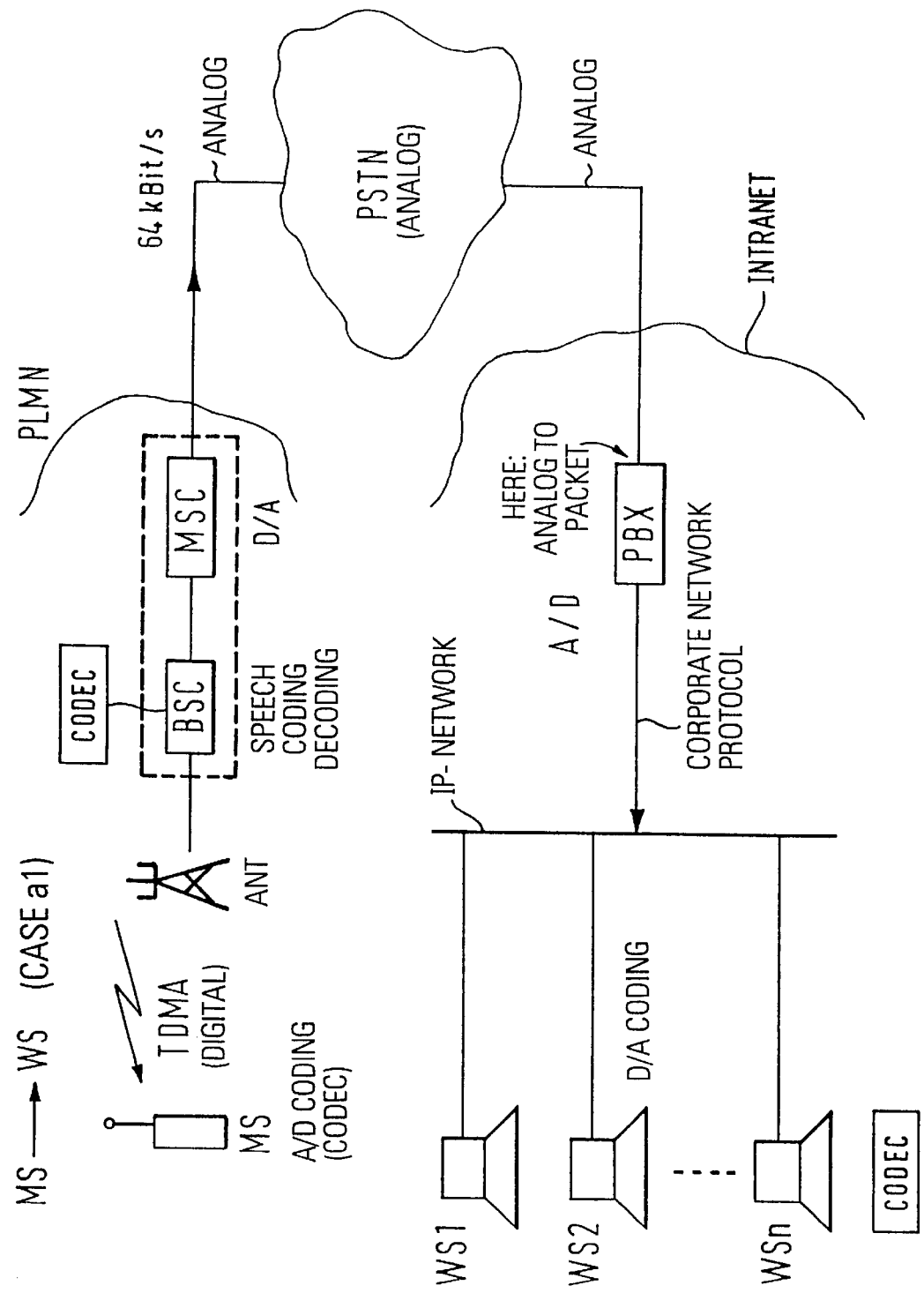

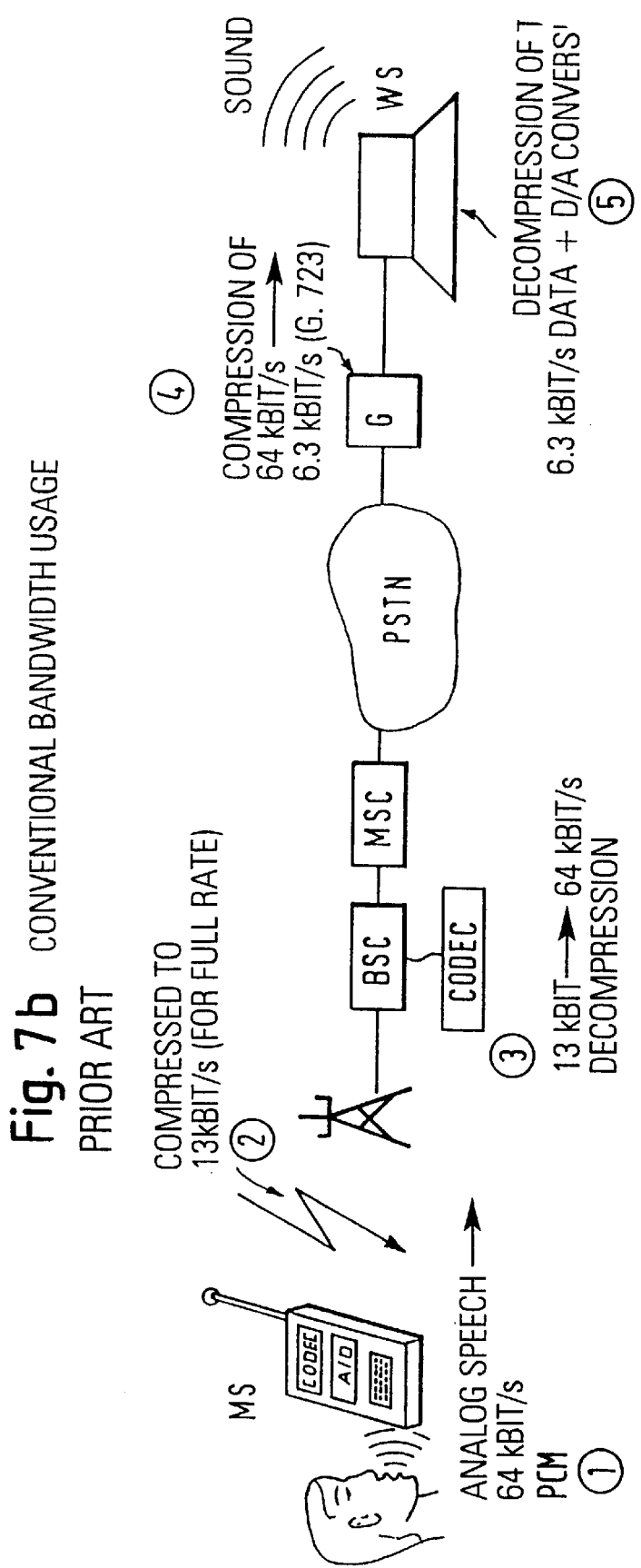
Fig. 7b CONVENTIONAL BANDWIDTH USAGE
PRIOR ART

METHOD, SWITCHING MEANS AND TELECOMMUNICATION SYSTEMS FOR PERFORMING DATA COMMUNICATIONS BETWEEN SUBSCRIBER STATIONS

FIELD OF THE INVENTION

The invention relates to a method, a switching means and a telecommunication system for performing data communications between a first subscriber station of a mobile radio communication network and a second subscriber station which is connectable to said mobile radio communication network. The second subscriber station can be connected to the mobile radio communication network through the internet and/or a conventional public switched telephone network.

In particular, the invention relates to performing data communications between a mobile station of the mobile radio communication network and a second subscriber station connected to a data network (such as a data network running internet protocol (IP)). Such a second subscriber station can e.g. be an internet telephone constituted by a special internet telephone hardware or software on a workstation capable of supporting the internet protocol.

The mobile radio communication network can be a GSM-based mobile radio network (GSM: Global System of Mobile Communications), such as a D1, D2 or E-plus radio communication network in Germany.

BACKGROUND OF THE INVENTION

In public switched telephone networks (PSTNs), conventionally each subscriber participating in a call has a separate telephone hand set into which the subscriber talks and from which speech is reproduced. Such conventional telephone hand sets can be radio telephones (which allow a free movement of the subscriber at home) which may use analog or digital transmission techniques even when being connected to a conventional public switched telephone network, such as German Telecom in Germany. Several conventional telephones may be interconnected in a private branch exchange system which interconnects the several telephones to one or more outside lines (conventional lines or ISDN lines).

Additionally, most subscribers nowadays also own a mobile radio telephone together with a subscription to a mobile radio communication network. The mobile radio telephone uses entirely digital transmission techniques for communicating with entities in the mobile radio communication network, e.g. with the mobile switching center thereof. Calls between mobile radio telephones or between a conventional telephone hand set and a mobile radio telephone are routed through the mobile radio communication network and the public switched telephone network.

Instead of just routing a telephone call from a public switched telephone network to a private branch exchange system (PBX), it is now also possible to route a call first to a computer network. Such a computer network can e.g. be constituted by a company intranet. Normal workstations of the computer network which have been upgraded with software or hardware to operate as a conventional telephone and/or as an internet telephone can be part of the computer network. Such computer-based telephones become more and more widespread such that it is soon anticipated that at least one party in a telephone communication is using a computer-based telephone instead of a conventional telephone hand set. Some computer networks or intranetworks as well as their interconnected workstations including the telephone software/hardware already use internet protocols for communication. This is e.g. described in an overview article by Linden decarmo "Internet Telephone Standards", PC Magazine, Feb. 18, 1997, pages 185 to 187.

Although the workstation running the telephone software and/or the mobile radio telephone of the mobile radio communication network constitute quite advanced units with respect to their digital speech coding/decoding units, the analog voice—when spoken into the microphone of the respective telephone—must still be digitized and compressed due to the restrictions imposed on the bandwidth in the available transmission channels, e.g. when the call still needs to be routed through the public switched telephone network. If e.g. a call is originated from a mobile radio telephone of a digital mobile radio communication network, the call will undergo several speech coding/decoding stages before reaching the final called subscriber station. Since each coding/decoding introduces errors, such several stages of decoding/coding processes drastically deteriorate the speech quality received at the called subscriber station.

For example, the compression protocols used in the GSM network and internet telephony are not the same and therefore there is a need for several coding/decoding (audio data compression/decompression) stages.

If internet telephones become more and more common in the future, it might be wise from the network utilization point of view to route the call from the telephone network to the IP-network (IP: Internet Protocol) from the network unit where the call is originated from. The possibility to route the call to a mobile subscriber in an IP-network directly to the serving mobile switching center opens new possibilities for cooperation between owner of IP-networks and mobile operators. For example, an international call from an internet telephone can be routed in the IP-network instead of the public switched telephone network PSTN.

Call Set-Up Between Mobile Station and Workstation

Presently, several possibilities for setting up a call between a mobile radio telephone (a first subscriber station) of a mobile radio communication network and a workstation running a telephone or internet telephone software (a second subscriber station connectable to the mobile radio communication network) can be imagined, as will be explained below with reference to FIGS. 7 to 11. The invention uses all such call set-up possibilities.

a) Call from a Mobile Station to a Workstation Connected to an Internet Protocol Network FIG. 7a shows an example of a telephone communication system where a mobile station is transmitting digitally (via a TDMA method) digitally coded speech via an antenna ANT to a switching means BSC/MSC of the mobile radio communication network PLMN. Here the switching means comprises a base station controller BSC and a mobile switching center MSC. The base station controller BSC inherently comprises an audio data (speech) coding/decoding means which is indicated with CODEC in FIG. 7a.

Basically, as will be explained in more detail with reference to FIG. 7b, the call originated from the mobile station MS is decompressed in the audio data coding/decoding means such that a data rate of a bandwidth of 64 Kbit/s is transmitted through the public switched telephone network PSTN to the company intranet. Here, the call may be routed through a private branch exchange system PBX to the data network (IP-network), to which the individual workstations WS1, WS2, ..., WSn are connected. Since the workstations WS1, WS2, ..., WSn run a digital telephone network, the data arriving from the PSTN is digitally decoded after which an audio data (speech) coding/decoding means CODEC in the workstations WS perform the final digital/analog conversion. The PBX in FIG. 7a has a CODEC which can compress (i.e. code) the received speech using a protocol supported by the WS.

The call set-up in FIG. 7a is as follows. The mobile station MS sends a call set-up message including a calling number of the second subscriber station WS which is served by the PBX. Thus, the PBX must have the information that the called second subscriber station—i.e. the workstation running the telephone software—wants all calls arriving for it to be diverted to the internet telephone software running on the workstation. In this case, the PBX needs protocol translation and speech coding between the PSTN and the internet telephone software running on the workstation. Since e.g. the internet telephone uses a packet-based transmission, the PBX must also perform the analog-to-packet conversion. Although the mobile station MS on one side and the workstation WS on the other side each run very advanced digital coding and transmission techniques, intermediate speech coding/decoding is still performed in the base station controller BSC and the PBX. This can deteriorate the audio data (speech) quality and slow down the transmission process as is explained in FIG. 7b.

FIG. 7b shows the data rates during the compression/decompression for the situation in FIG. 7a. At ① an analog/digital converter in the mobile station converts the analog speech to a 64 kBit/s PCM signal. The CODEC of the mobile station MS compresses this PCM signal to 13 kBit/s (in case of a full rate coding) which is then transmitted to the switching means. At ③ the CODEC of the base station controller BSC performs a decompression of the 13 kBit/s PCM data into a 64 kBit/s PCM data. At ④ the gateway compresses the incoming 64 kBit/s PCM data for example to a 6.3 kBit/s PCM data, for example using G. 723. Finally at ⑤ the workstation WS performs a decompression of the 6.3 kBit/s data, performs a D/A conversion and outputs the sound. Using two (lossy) speech codings reduces the quality of the sound. As a result the received sound in the workstation is not the same as in the GSM network. While FIG. 7b shows the situation for the GSM full rate speech coding, as its implementations are available on computers quite easily, it should be understood that the same problem likewise occurs with other speech coders specified for GSM, for example speech coders using half rate speech coding (GSM 06.20(prETS 300 581-2): "European Digital Cellular Telecommunication System (phase 2); half rate speech transcoding" or enhanced full rate coding (GSM 06.60 (prETS300 762-1)).

FIG. 8 shows another configuration of a telecommunication system, where communication between the mobile station and the workstation is carried out through the PSTN and the internet. The PSTN and the internet communicate through an internet PSTN-gateway IG. The IG is a server run by the operators of the PSTN or the PLMN. Here, the workstation WS is identified by a number which the operator has issued for this internet telephone device (i.e. for the software or hardware running on the workstation).

Thus, when setting up a call, the mobile station calls a number of the second subscriber station which the operator has issued. When the call arrives at the internet PSTN-gateway server IG, the server will set up the protocols to be used between the gateway and the internet telephone. During the call, it will do the protocol changes between the internet telephone and the normal telephone call arriving from the PSTN. Obviously, the internet and the workstation running the telephone software can communicate via packet transmission fully digitally. Nonetheless, the audio data coding/decoding (compression/decompression) is done in the base station controller BSC, before the call is routed into the PSTN.

b) Call from a Workstation/Mobile Station of the PLMN to a Workstation of the IP-network FIG. 9 shows a telecommunication system where the mobile station MS is connected to a computer WS running an internet telephone program. The call is routed from the mobile switching center MSC through a direct access unit DAU to the internet and from there to the company intranet to which workstations WS are connected that also run internet telephone programs.

Since the PSTN is not involved in the setting up of the call, the complete call is handled as a data call, not as a speech call. The mobile radio communication network routes the data call via internet to the second subscriber station WS using the user name and IP-address (or fully qualified domain name) of the second subscriber station. The mobile radio communication network is transparent in this case and from the user's point of view, the call is just like any other call between two computers running an internet telephone program over the internet.

However, in this case, when transferring speech data as a pure data call, only a data rate of 9.6 kBit/s can be used. Thus, a sound quality at the WS is less than in a speech call. The GSM network may offer other solutions in the near future, which will allow pure data calls with data rates up to four times of that, but their usage for speech calls will be far more expensive than normal speech calls.

c) Call from a Workstation to a Computer Connected to a Mobile Station

FIG. 10 shows a telecommunication system where a workstation WS of a data network (IP-network) incorporated in an intranet sets up a call to a computer or workstation WS connected to a mobile station MS of the mobile radio communication network PLMN. Since the internet uses a packet-orientated transmission, the PLMN has been expanded with GPRS features (GPRS: General Packet Radio Service) allowing a packet orientated transmission.

Such a GPRS-system comprises (amongst others) the serving GPRS support node SGSN and the gateway GPRS support node GGSN. Also in this case, the call is handled as a pure data call.

When a connection is to be established, the IP-number of the computer to be called (i.e. the first subscriber station WS/MS) is known by some unit in the mobile radio communication network. This unit is the gateway GPRS support node which knows to which serving GPRS support node the data should be sent. Therefore, the workstation WS first makes a connection to-this unit GGSN, which then knows how to make a connection via the mobile station MS to the computer WS connected to it.

Although such a call setup is in principle possible, it is not very cost effective nor efficient, as the GPRS network is specially designed to handle short data bursts instead of continuous long data streams like digitalized speech.

d) Call from a Workstation Connected to an IP-network via Internet/PSTN to a Mobile Station MS FIG. 11 shows a telecommunication system where the call originated from the workstation is routed through internet and an internet PSTN-gateway server to the PLMN and thus to the mobile station MS. Here, the workstation WS contacts the gateway server IG using the IP-address of that server.

Thereafter, the workstation WS provides the calling telephone number of the mobile telephone MS. The gateway IG then makes a normal PSTN-MS call using this number. During the call, the gateway IG does the decompression of the speech used in the internet telephone protocol between the workstation WS and the gateway IG and for the other direction it does the speech compression for the speech data received from the PSTN.

Thus, also in FIG. 11, two sites are present where a speech compression/decompression (encoding/decoding) takes place, namely in the BSC and the IG. This has obviously a deteriorating effect on the speech quality.

In the examples in FIGS. 7 to 11, the workstation running an internet telephone program can be any computer connected to an IP-network that is using an internet telephone program which allows the user to make calls over the IP-network to any other user or any other workstation running an internet telephone program. If the user has an access to an internet PSTN-gateway he/she can also make calls via this gateway to any other normal telephone.

The internet PSTN-gateway server IG acts as a gateway between internet and PSTN. It can establish a connection to any telephone using a normal telephone number. It can also connect a user on a workstation by knowing its IP-address and user name. This gateway may contain a database on the IP-number corresponding to a telephone number. This gateway can also be part of a private branch exchange system PBX, namely it can be part of the private branch exchange. The gateway performs a translation from uncompressed 64 kbit/s digital speech (received from the PSTN) to compressed speech using a protocol negotiated during the call set-up phase between the server IG and the internet telephone program. In the other direction, it decompresses the speech from the IP-network and forwards it to the PSTN.

Although, in FIGS. 7 to 11, the PSTN (Public Switched Telephone Network) is used for routing the call to the correct destination on the basis of a telephone number, in a call set-up phase, it is possible to inquire the capabilities of the exchanges along the route (e.g. Do all the exchanges provide support for a certain service etc.). It should further be noted that even in a configuration like FIG. 11, all traffic is communicated digitally, although there may still be some analog exchanges present.

SUMMARY OF THE INVENTION

As was explained with reference to FIGS. 7 to 11 above, it is envisaged that calls can be set up between mobile stations and workstations running a telephone software through various paths, e.g. directly through the internet or indirectly through the PSTN and then through the internet. It is also possible to connect a computer running a telephone software to the mobile station and then likewise set up a call to a workstation running an internet telephone software.

However, due to several compressions/decompressions, the speech quality deteriorates on the transmission path between the mobile station and the workstation.

Thus, the object of the present invention is
the provision of a method, a switching means and a telecommunication system, which maintain a high speech quality between a first subscriber station of the mobile radio communication network and a second subscriber station connectable to the mobile radio communication network, in particular for cases when the second subscriber station uses a telephone software running on a computer.

SOLUTION OF THE OBJECT

This object is solved by a method for performing data communications between a first subscriber station (MS) of a mobile radio communication network (PLMN) and a second subscriber station (WS) connectable to said mobile radio communication network (PLMN), wherein at least said first subscriber station (MS) comprises an audio data encoding/decoding means (CODEC), comprising the following steps: sending a call set-up message from said first or second subscriber station (MS) to a switching means (BSC, MSC/VLR) of said mobile radio communication network (PLMN) to set up a call between said first and second subscriber stations (WS, MS); determining on the basis of said call setup message whether said second subscriber station (WS) is of a type also comprising an audio data encoding/decoding means (CODEC); setting up a call between said first and second subscriber station (WS); switching off an audio data encoding/decoding means (DECOD) in said switching means (BSC, MSC/VLR), if said second subscriber station (WS) also comprises an audio data encoding/decoding means (CODEC); and encoding/decoding audio data at said first and second subscriber station (MS, WS) using said respective encoding/decoding means (CODEC) and communicating said coded audio data through said switching means (BSC, MSC/VLR) without applying an audio data coding/decoding thereto in said switching means (BSC, MSC/VLR).

Furthermore, this object is solved by a switching means (BSC, MSC/VLR) of a mobile radio communication network (PLMN) for communicating data between a first subscriber station (MS) of said mobile radio communication network (PLMN) and a second subscriber station (WS) connectable to said mobile radio communication network (PLMN), wherein at least said first subscriber station (MS) comprises an audio data encoding/decoding means (CODEC), comprising: an audio data encoding/decoding means (CODEC) including first state in which digital audio data received from said first/second subscriber station is encoded/decoded; and a second state in which digital audio data received from said first/second subscriber station is passed without applying an audio encoding/decoding thereto; subscriber station type determining means (SSTDM) for determining whether said second subscriber station (WS) is of a type comprising an audio data encoding/decoding means (CODEC) on the basis of a call-set-up message sent from said first or second subscriber station (MS) in a call set-up phase; and control means (CNTRL) for switching said audio data encoding/decoding means (CODEC) of said switching means into said second state when said subscriber station type determining means (SSTDM) determines that said second subscriber station (WS) is of type also having an independent audio data encoding/decoding means (DECOD).

Furthermore, this object is solved by a telecommunication system (PLMN, PSTN, INTRANET; INTERNET, IP-NET), comprising: a mobile radio communication network (PLMN) to which at least one first subscriber station (MS) having an audio data coding/decoding means (CODEC) is connected; an intranet to which at least one second subscriber station (WS) is connected; and internet and/or a public switched telephone network (PSTN) connected between said mobile radio communication network (PLMN) and said intranet; wherein said mobile radio communication network (PLMN) comprises a switching means (BSC, MSC, VLR) for communicating data between one first and one second subscriber station (MS, WS) including: an audio data encoding/decoding means (CODEC) including a first state in which digital audio data received from said first/second subscriber station is encoded/decoded; and a second state in which digital audio data received from said first/second subscriber station is passed without applying an audio data encoding/decoding thereto; subscriber station type determining means (SSTDM) for determining whether said second subscriber station (WS) is of a type comprising an audio data encoding/decoding means (CODEC) on the basis of a call-set-up message sent from said first or second subscriber station (MS) in a call set-up phase; and control means (CNTRL) for switching said audio data encoding/decoding means (CODEC) of said switching means into said second state when said subscriber station type determining means (SSTDM) determines that said second subscriber station (WS) is of type also having an independent audio data encoding/decoding means (CODEC).

Therefore, according to the invention, the switching means of the mobile radio communication network comprises an audio data encoding/decoding means which has two states. In a first state, the digital audio data coming from the mobile station or being transmitted to the mobile station undergoes normal compression/decompression. In a second state, the digital audio data from/to the mobile station passes through the switching means without applying any coding/decoding to it.

Whether the first or second state of the audio data encoding/decoding means is selected is determined by a subscriber station type determining means. Whenever the subscriber station type determining means determines that the second subscriber station is a workstation computer running a telephone software being connected to an Internet protocol network, the subscriber station type determining means recognizes that digital uncompressed data can be sent/transmitted directly to the workstation on the basis of this determination, the control means switches the audio data encoding/decoding means of the switching means into its second state, such that the data between the first and second subscriber station (the mobile station and the workstation) is freely communicated without applying any additional and unnecessary speech encoding/decoding to it. Since unnecessary speech compression/decompression is avoided, the speech quality is improved.

Depending on the configuration of the telecommunication network, the switching means of the mobile radio communication network either receives a message from a calling workstation that the workstation does not need compressed/decompressed speech data or the switching means itself can enquire whether the called second subscriber station is one that supports a telephone software on a computer. Preferably, the switching means of the mobile radio communication network, the gateway exchange of the public switched telephone network or the internet PSTN-gateway are connected to a respective memory where the specific details of the first and second subscriber stations are recorded. Therefore, independently as to whether the mobile station or the workstation originates the call, it can always be ensured that there is no unnecessary speech compression/decompression after the call has been set up.

Further solutions of the above object are listed in claims 33–46. Further advantageous embodiments and improvements of the invention are listed in the dependent claims. Hereinafter, the invention will be described with reference to its embodiments and the attached drawings. In the drawings, the same or similar reference numerals designate the same or similar parts throughout.

BRIEF DESCRIPTION OF THE DRAWINGS

FIG. 1 shows a switching means BSC/MSC/VLR of a mobile radio communication network according to the invention;

FIG. 2 shows a flowchart for the operation of the switching means in FIG. 1;

FIG. 3 shows an embodiment of the invention if a mobile station MS calls a workstation WS through the internet;

FIG. 4a shows an embodiment of the invention if a mobile station MS calls a workstation WS through the internet or a public switched telephone network PSTN;

FIG. 4b shows the data rates for the situation that the call is routed through the PSTN in FIG. 4a;

FIG. 5 shows an embodiment of the invention if a workstation WS calls a mobile station MS through the internet and/or through a PSTN;

FIG. 7a shows an example of the speech compression/decompression when a mobile station MS calls a workstation WS through a PSTN;

FIG. 7b shows the data rates for the situation in FIG. 7a;

PRINCIPLE OF THE INVENTION

Figure 6:
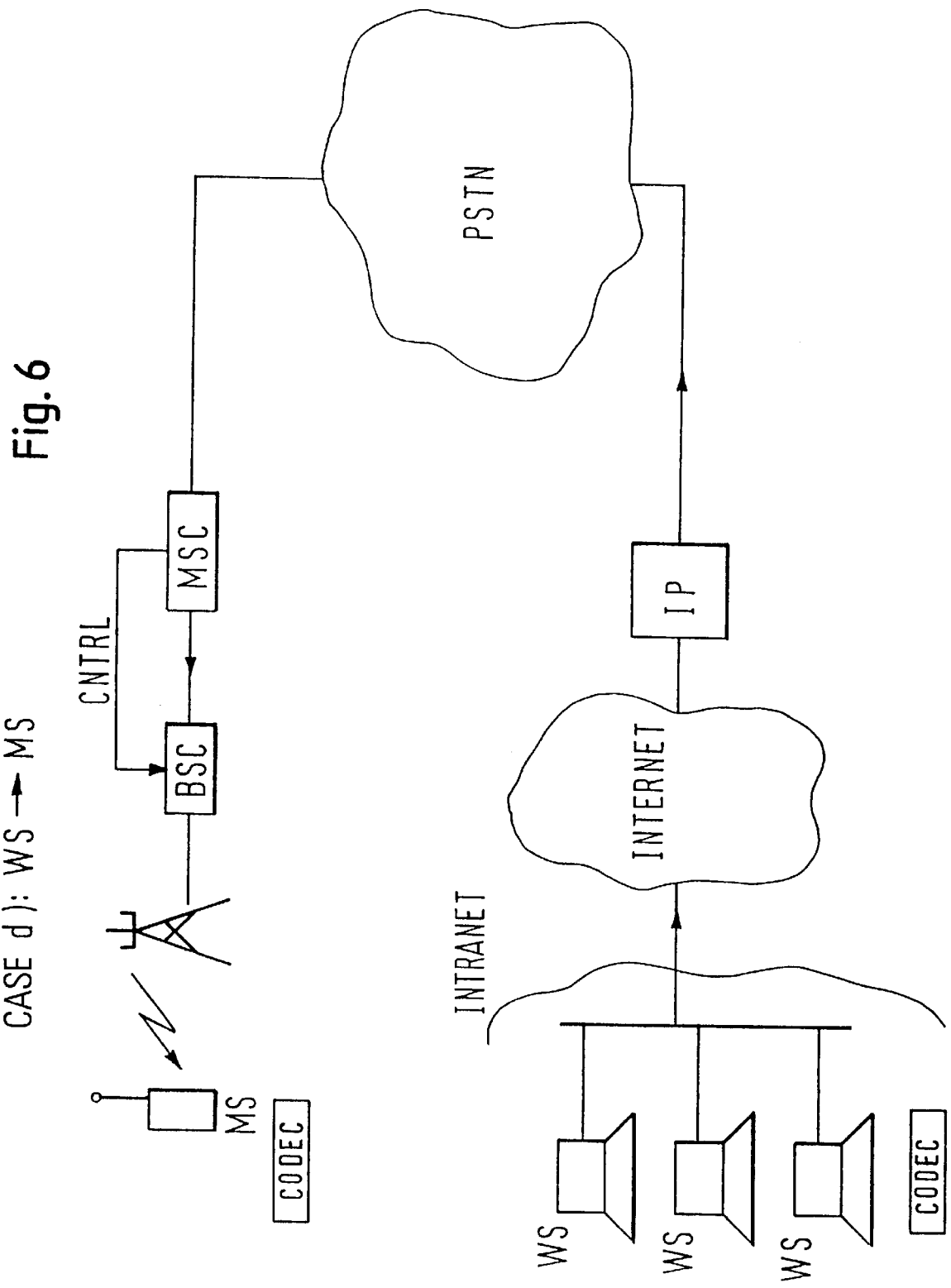
FIG. 6 shows an embodiment of the invention when a workstation WS calls a mobile station MS through the internet and the PSTN.
Figure 8:
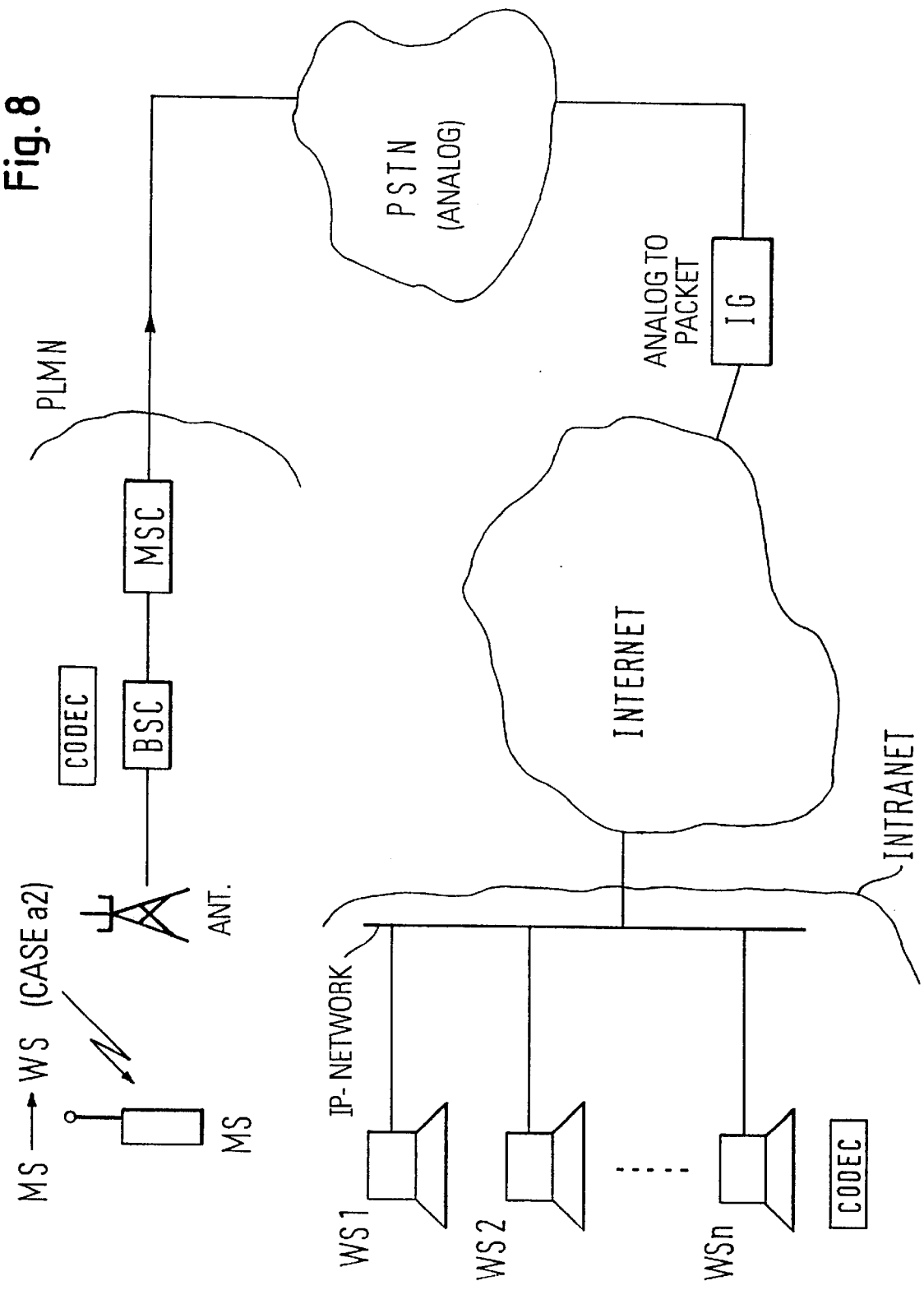
FIG. 8 shows an example where a mobile station MS calls a workstation WS through a PSTN and the internet.

FIG. 1 shows an overview of the principle of the invention, in particular an inventive switching means constituted by a base station controller BSC having an audio data coding/decoding means CODEC and a mobile switching center/visitor location register MSC/VLR. It should be understood that any of the network interconnections shown in FIGS. 7 to 11 can be applied to FIG. 1, as is schematically indicated with "internet" and "PSTN" in FIG. 1. That is, a first subscriber station MS/WS having an audio data coding/decoding means CODEC is connected to the mobile radio communication network PLMN. The first subscriber station can be a mobile station MS.

A second subscriber station WS, preferably a workstation WS running an internet telephone software/hardware, is connected within an intranet via an IP-network. As is illustrated in FIGS. 7 to 11, an internet and/or a public switched telephone network may be connected between said mobile radio communication network PLMN and said intranet. Other units as in FIGS. 7 to 11, like the PBX, the IG etc., are also provided.

According to the invention, the audio data encoding/decoding means CODEC of the base station controller BSC has two operation states. In a first state, digital audio data received from said first subscriber station is compressed and digital audio data received from said second subscriber station (i.e. from said mobile switching center) is decompressed and vice versa. In a second state (a through-state), any digital audio data received either from said mobile switching center MSC/VLR or from said first subscriber station MS/WS is passed without applying any coding/decoding the control means CNTRL switches the CODEC into its first or second operation state.

A subscriber station type determining means SSTDM is preferably provided within the mobile switching center MSC/VLR. SSTDM determines whether said second subscriber station WS is of a type comprising an audio data encoding/decoding means CODEC. That is, the second subscriber station may be a conventional telephone hand set, a mobile station or a workstation running an internet telephone software/hardware.

When the mobile station MS/WS sends a call set-up message to the switching means BSC/MSC/VLR to set up a call to the second subscriber station WS, the determining means SSTDM determines whether the second subscriber station WS has its own audio data encoding/decoding means CODEC. That is, the determining means SSTDM checks whether or not the second subscriber station WS can completely understand the digital data (in an uncompressed state) which is sent from the mobile station (or the workstation connected to the mobile station). Several methods how the determining means SSTDM can determine what type of second subscriber station is called are described below.

Most importantly, the subscriber station type determining means SSTDM controls the CODEC in the base station controller BSC into its second operation state (its through-state) when it determines that the second subscriber station is one that can fully process digital data produced by the mobile station MS. Therefore, at least the compression/decompression (encoding/decoding) conventionally performed in the CODEC of the BSC is circumvented and the speech quality is improved.

It should also be noted that the same procedure can be carried out, if the second subscriber station sends the call set-up message to its gateway server and eventually to the mobile switching center MSC/VLR of the mobile radio communication network PLMN. That is, in this case the determining means SSTDM does not determine whether the called first subscriber station is one having an independent audio data encoding/decoding means (since obviously the mobile station will always comprise such means), but it will in this case determine whether the calling second subscriber station WS is one that supports an IP-protocol, i.e. has its own audio data encoding/decoding means CODEC. Methods how this can be determined with different interconnections of the second subscriber station via internet and/or a PSTN to the PLMN are described below.

Therefore, assuming that the mobile station MS (the first subscriber station) is already capable of producing digitally coded speech (audio) data, it is only necessary for the determining means SSTDM to determine whether the called or calling second subscriber station WS also has its own independent audio data encoding/decoding means CODEC. If so, then there is no necessity to perform a further compression in the means CODEC of the base station controller BSC and therefore the determining-means SSTDM instructs the base station controller BSC to assume its second operation state.

FIG. 2 shows an embodiment of the inventive method, i.e. a call set-up if the first or second subscriber station sends a call set-up message to the MSC or the respective gateway server.

In step S1, a subscriber station sends a set-up message, e.g. in a digital mobile radio communication network. The set-up message includes a subscriber station number which may be reserved to be used in a computer connected to the IP-network. Therefore, in step S2, the determining means SSTDM interrogates to which IP-address the call should be connected to and to which user name. Step S2 equally well applies to the case where the second subscriber station originates a call.

In step S3, the mobile switching center MSC (the switching means) sets up a connection, preferably using the direct access unit DAU through the IP-network to the second subscriber station, e.g. an internet telephone server program running in the workstation computer WS using the ITU H.24 control signals, which are transmitted over the IP-protocol, to check the capabilities of the receiving unit (e.g. whether a GSM speech coding is supported), asks whether the server program of the IP-network can reach the end user e.g. by notifying an end user program, and waits for an answer to the call. That is, before the call is being set-up, in step S3, the determining means SSTDM uses the ITU H.245 control signals to establish whether the called (calling) second subscriber station WS is one that supports an audio data compression/decompression.

Then, the call between the first and second subscriber station is set up in step S3. If the call set-up has been successful in step S3, the mobile switching center MSC now commands the base station control BSC not to decode (compress) the speech coming from the mobile station MS but to route the coming data directly through the mobile switching center MSC which forwards the data through the IPnetwork to the second subscriber station, i.e. to the telephone program running in the workstation computer WS. The base station controller decoder/encoder is therefore switched off in step S5, if it has been determined in steps S2, S4 that the second subscriber station WS supports an audio data compression/decompression. In step S6, the audio data is exchanged using the ITU H.323 standard extended with a GSM speech coding. If it has been determined in step S2 that the second subscriber station is not a subscriber station that can support a speech decoding, then the CODEC in the base station controller BSC is left in its first state where a speech encoding/decoding (compression/decompression) is continuously carried out during the call.

However, if it has been determined that the second subscriber station WS is well capable of performing a speech decoding (decompression), the program in the second workstation will then do the speech decoding from the received data and outputs the speech through the loudspeakers or headphones connected to the workstation computer WS. In the other direction, the computer running the telephone software/hardware performs an analog/digital conversion of the speech (audio) received through a microphone and makes segmentation and speech coding for the call. In this case the information is then transferred via the IP-network to the mobile switching center MSC, which routes it directly to the base station controller (whose CODEC is switched into its second operation state) which does not perform a digital/digital conversion or speech coding, but takes care that the data is transferred through the air interface to the first mobile subscriber station as it is. Therefore, FIG. 2 equally well applies for the case where the first or second subscriber station initiates the call via the call set-up message.

Therefore, in a direction from the mobile station to the workstation of the IP-network, the mobile station performs an analog/digital conversion of the analog speech (audio) and this digitally coded data is routed transparently up to the workstation computer WS running the telephone software which is capable of performing the digital decoding of the received data into analog speech. Likewise, in a direction from the workstation computer WS to the mobile station MS, the workstation WS will perform the digital encoding and the digitally encoded data is then routed through the mobile switching center to the mobile station MS without applying a further coding/decoding thereto in the base station controller BSC.

That is, when a call set-up message is sent from an internet telephone computer WS to the digital mobile telephone MS, the program in the workstation computer MS connects to the gateway server of its IP-network, which functions e.g. as a gateway to the PSTN. For example, when the exchange in the PSTN which is connected to the gateway notices that the call is for a mobile subscriber and it is coming from an IP-network unit, which is capable of audio data speech coding (GSM speech coding), it asks from the gateway MSC of the mobile radio communication network using the extended signalling system 7, if the mobile switching center to which the first subscriber station is connected at that moment is able to accept a call from an IP-network, in which case the exchange of the PSTN returns an IP-address of the server part in this mobile switching center MSC to the gateway exchange. The gateway exchange in turn advises the internet telephone program of the second subscriber station (the computer of the workstation WS) to build up directly a connection to this IP-address using the ITU H.323 protocols mentioned above. During this call set-up, the mobile switching center MSC marks the subscriber busy and returns a roaming number which is used to identify the subscriber to which the incoming call from the IP-interface is forwarded. As will be seen below, the server part in the MSC is constituted by a direct access unit DAU. Again, once the mobile switching center MSC has realized that the call is coming from an IP-network unit (a workstation) which is capable of audio data speech coding (e.g. GSM speech coding), it will control the audio data encoding/decoding means CODEC of the base station controller BSC into its second state.

Any known technology can be used in the workstation WS to do the speech coding and decoding either with hardware and software or only with software. Considering the fact that the mobile station already performs an analog/digital conversion for the TDMA-transmission to the BSC, what is meant with "audio data encoding/decoding" in the BSC is in fact the speech encoding/decoding and/or speech compression/decompression before the data is routed to the MSC. An example of such a speech encoding/decoding can be found in the ETSI standards documents, see e.g. GSM 06.10 (prETS 300 580-2): "European digital cellular telecommunication system (phase 2); full rate speech transcoding" which is the standard. There is also an article in Dr. Dobbs Journal December 1994 by Jutta Degener called "Digital Speech Compression" describing the speech encoding/decoding. Likewise, the fact that the internet telephone program can perform the speech encoding/decoding and the conversion from digital to analog speech directly, is described in "The standard documents ITU (International Telecommunication Union) recommendations G.711 ($\mu$-law and A-law compression) and G.723.

As an example it was assumed that the audio data encoding/decoding means CODEC is located in the BSC; however, it may be located elsewhere in the mobile radio communication network PLMN. Although the second state is described as one where the data passes through the CODEC in the BSC, it may be noted that the control means can also perform a function where the data arriving at the BSC is completely diverted and does not run through the BSC at all. For example, in a GSM network the CODEC can be placed either in a base station or in a base station controller (BSC). The important aspect of the invention is that the BSC can control the CODEC to be switched on or off independently of where it is located.

As explained above, the invention concerns a situation where the speech (audio data) is transferred as data. However, as was explained with reference to the data call in FIG. 9, a clear distinction should be made in a GSM network between a speech call and a data call. The pure data call does not have the bandwidth of a speech call. On the other hand all data in a data call is transferred in the GSM network as such, namely without applying any speech decoding/encoding to it, since this would result in data loss in a data call since all GSM speech coders are lossy (they loose information due to thee decoding/encoding). Therefore, it should be understood that in the present embodiments the audio data is not transferred as a data call, but is intended to be transferred as a speech call where conventionally using a broader bandwidth an encoding/decoding would be applied in the switching means something that is circumvented by the present invention.

Whilst FIGS. 1, 2 in general describes the principle of the invention, hereinafter, specific embodiments of the method, switching means and telecommunication system are described with reference to FIGS. 3 to 6. Regarding the set-up of the call, with respect to the network configuration and the call set-up, these embodiments may be seen in connection with the analogous cases in FIGS. 7 to 11 described above.

Call from a Mobile Station to a Workstation Connected to an IP-network

Figure 9:
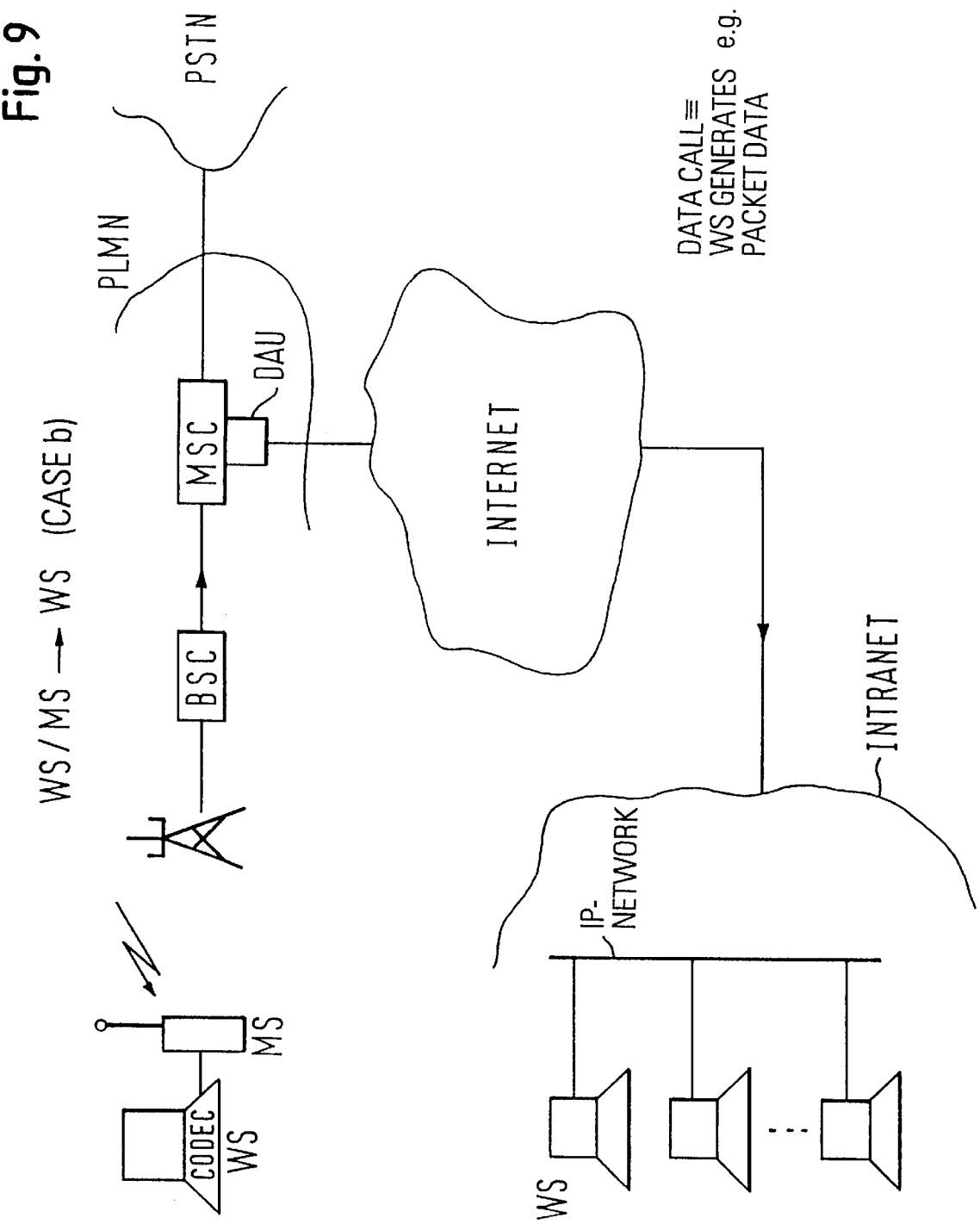
FIG. 9 shows an example where a mobile station MS calls a workstation WS directly through the internet as a data call.

FIG. 3 shows an embodiment of the inventive telecommunication system corresponding to FIG. 9 where a workstation WS being part of an IP-network (INTRANET) is connected to the internet (via a gateway server). The internet communicates with the mobile switching center of the mobile radio communication network PLMN through a direct access unit DAU. A first memory means DB is connected to the mobile switching center MSC. The switching means BSC/MSC is configured as in FIG. 1. The first memory means DB contains a number of entries that indicate a relationship between the numbers of second subscriber stations and their IP-addresses as well as their user names. For example, the MSC can access the first memory means DB and detect that the second subscriber station having the "normal" telephone number 1234567 has in fact associated an IP-address (IP-telephone number) 127.0.0.1 and an associated user name bsub. From this, the mobile switching center MSC can determine that the workstation with the telephone number 1234567 is in fact a type of subscriber station that comprises its own audio data encoding/decoding means. MSC concludes therefrom that there is no necessity to perform the audio data encoding/decoding in the BSC and can therefore control CNTRL the CODEC in the BSC into its second state where no speech coding/decoding is performed.

That is, if the first subscriber station MS sends a call set-up message to the MSC, MSC analyses the called telephone number by referring to the entries in the first memory means DB. When it thus notices that the called telephone number is for a second subscriber station that is connected in a data network (such as internet) it reads from the first memory means DB the IP-address or fully qualified domain name corresponding to that call telephone number. After this, MSC will ask the second subscriber station WS if it supports audio data (speech) encoding/decoding (GSM speech encoding/decoding). If the second subscriber station supports such speech encoding/decoding, the MSC orders the BSC to turn off the GSM speech encoding/decoding for the duration of the call. If the program of the second subscriber station does not support GSM speech coding, then another protocol is negotiated and used, in which case the MSC does the translation from digital speech to the used protocol and the other way around in the opposite direction. In principle it would be sufficient to read out the IP-address from the data base to determine whether the B-subscriber equipment (i.e. the second subscriber station) supports the GSM speech decoding/encoding means. on the other hand, the user at the WS might have disabled the support for GSM speech CODEC for some reason (for example during a software update, a fault etc.) and preferably it should be ensured that the CODEC is really operable before the CODEC in PLMN is switched off.

In both directions, the call is then routed directly from the mobile switching center to the data network through internet. For the negotiation of the protocols, control signals are for example exchanged using H.245 over the IP-network whilst audio data is exchanged using the extended H.323.

It is also seen in FIG. 3 that here it does not make a difference whether a mobile station MS or a workstation connected to the mobile station MS originates the call. In both cases, the CODEC in the BSC is switched off if the second subscriber station WS supports the GSM speech encoding/decoding, something that is determined by the subscriber station type determining-means SSTDM in the MSC by referring to the first memory means DB as was explained above.

FIG. 4a shows an embodiment of the inventive telecommunication system where the call can either be routed through internet or through a conventional PSTN. When the mobile station MS sends the call set-up message during the call set-up phase, the switching means sends an enquiry message to a gateway exchange G-EX of the public switched telephone network PSTN (the exchange to which the called telephone number of the B-subscriber belongs to) in order to enquire whether the second subscriber station supports an audio data encoding/decoding means. If this means is not supported, then the call is continued as in FIG. 7. If the means is supported, the MSC orders BSC to turn off the audio data encoding/decoding means in the BSC for the duration of the call. The call is then routed through the PSTN as in FIG. 7, however, with the difference that no audio data encoding/decoding is applied in the BSC.

In a configuration in FIG. 4a where it is also possible to route the call through the internet, the MSC can also send after receiving the call set-up message from the first subscriber station—an enquiry message to the gateway exchange G-EX in order to find out whether or not the call is to be routed via an IP-network. If the answer is positive, the IP-address is returned to the MSC and MSC routes the call to the IP-network using that address through the internet.

In FIG. 4a, it is the gateway exchange G-EX of the PSTN which contains the information whether the telephone number called by the first subscriber station MS belongs to a second subscriber station of a type having an audio data encoding/decoding means.

FIG. 4b shows the bandwidth usage for the situation in FIG. 4a when the call is routed through the PSTN. FIG. 4a shows an example of data rates using the invention by contrast to the conventional situation according to FIG. 7b. As is seen in FIG. 4b the data rates are the same at ①, ②. At ③ the CODEC is turned off so that the bandwidth used is 13 kbit/s. At ④ the gateway just passes the data through to the workstation WS. The workstation decompresses the 13 kbit/s data and performs the D/A at ⑤ and outputs the sound. As already mentioned above, this bandwidth usage is not restricted to the specific coding used in the mobile station MS. Without any restriction the hardware coder could be employed to compress to 6.5 kbit/s, only that in this case the sound quality will be slightly lower.

Call from a Workstation WS Connected to an IP-network to a Mobile Station MS

Figure 10:
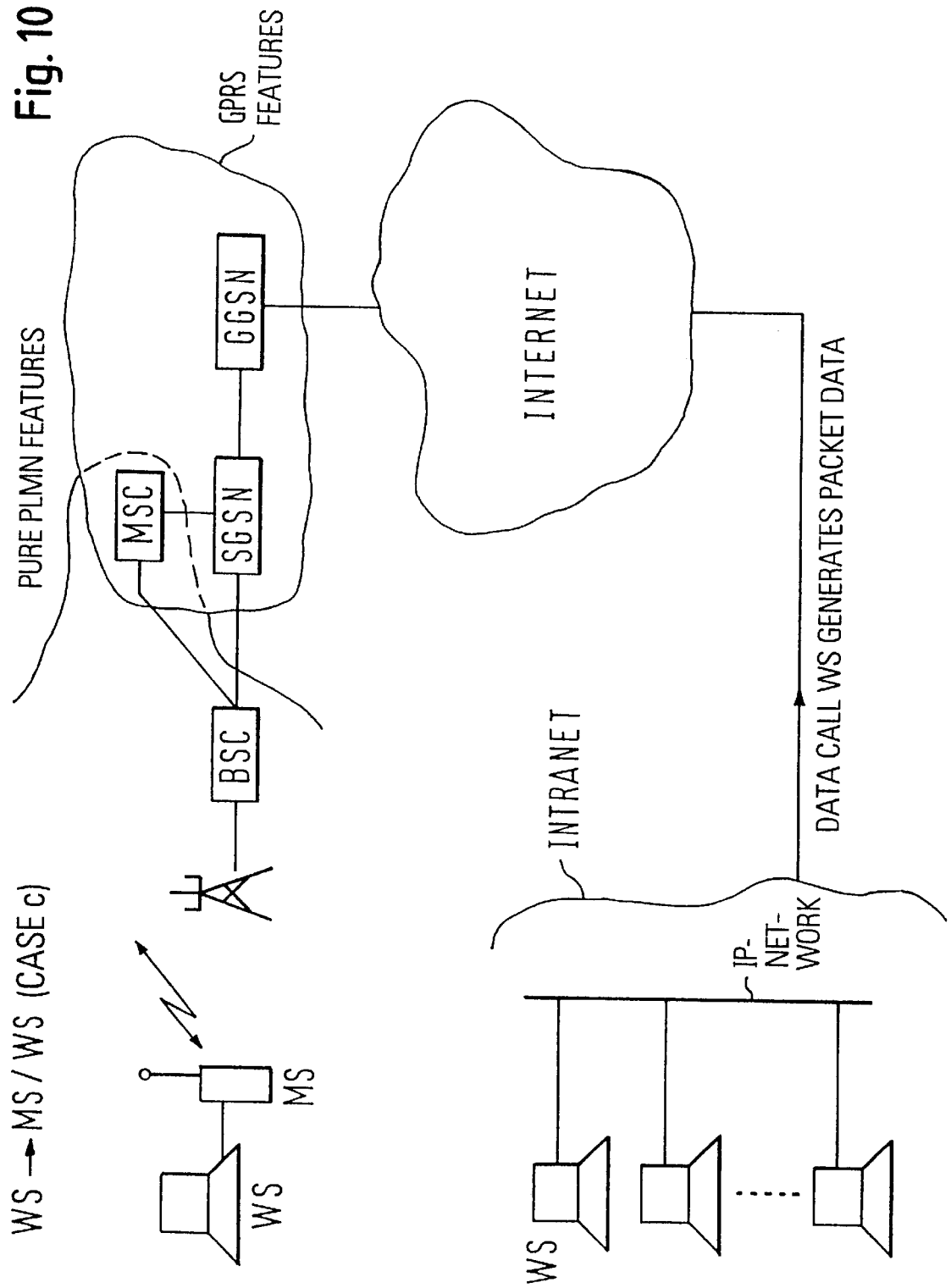
FIG. 10 shows an example where a workstation (computer) WS connected to a mobile station MS is called by a workstation WS through the internet and a GPRS-system.
Figure 11:
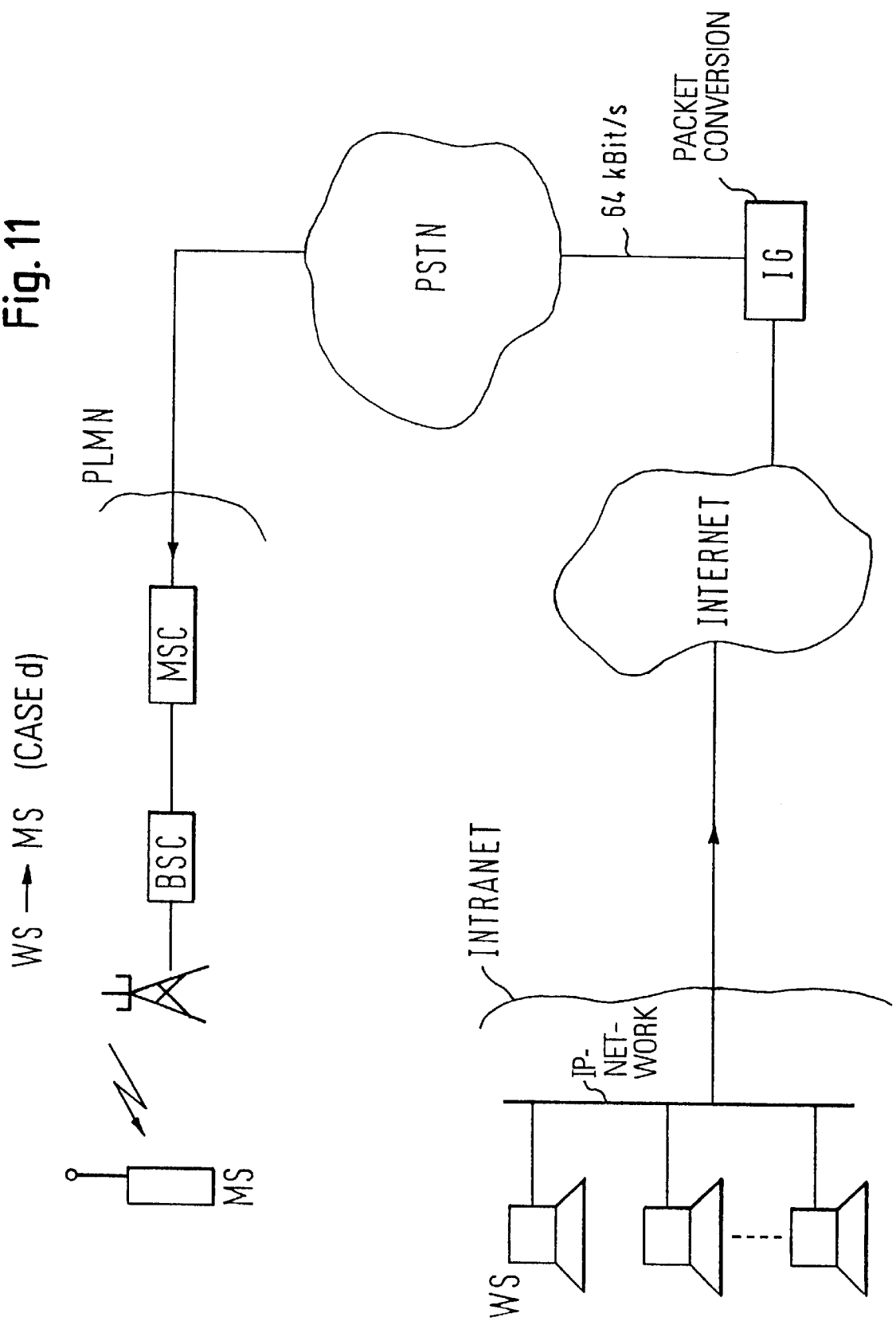
FIG. 11 shows an example where a workstation WS calls a mobile station MS through internet and the PSTN.

FIG. 5 shows an embodiment of the inventive telecommunication system corresponding to the situation in FIG. 10. In this case, the second subscriber station WS sends a call set-up message to the gateway server GS using the IP-address of that server and giving the telephone number of the mobile station and information that the workstation is capable of performing an audio data encoding/decoding via a corresponding means.

The gateway server GS recognizes (by referring to a second memory means DB) that the called telephone number belongs to a mobile switching center MSC which supports a switchable audio data encoding/decoding means in the BSC and which has a direct access unit DAU. When the gateway server GS recognizes from the second memory means DB that the base station controller BSC of the mobile radio communication network PLMN has an audio data encoding/decoding means which is switchable between two operation states, it will then directly set up the call to the IP-address that belongs to the direct access unit DAU of the MSC.

Therefore, when the MSC detects that a call is arriving at its direct access unit DAU, the MSC can always assume that the call has been originated from a second subscriber station WS which is capable of performing the audio data encoding/decoding. Therefore, in such a case, the MSC can always order the BSC to switch off its audio data encoding/decoding for all calls that are coming to this IP-address of the direct access unit DAU in a specific agreed way (for example, via a predefined part or special IP address or using a specific protocol).

For the configuration in FIG. 5, an explicit description how the entire call set-up is performed will be made below. The individual steps of the data communication between the first and second subscriber station are indicated in FIG. 5 with reference numerals ST1 . . . ST10. The telephone numbers and IP-address used in the following example are only examples and do not limit the invention thereto.

Step ST 1

A second subscriber station (a computer running an internet telephone) WS connects to the internet-PSTN gateway IG and includes in the call set-up message the request to make a call to a telephone number 1234567 of the mobile station MS.

Step ST 2

The internet-PSTN gateway forms a connection to the PSTN gateway exchange G-EX and informs the exchange G-EX that an internet telephone with GSM speech coding capability wants to call the mobile station with the telephone number 1234567.

Step ST 3

The exchange G-EX recognizes from the requested telephone number 1234567 that a call set-up request is being made to a mobile station MS and that it is coming from an IP-network. Since there are several mobile switching centers MSC within the PLMN, the exchange G-EX asks from the gateway MSC GMSC if the mobile switching center MSC where the mobile station is currently located supports an IP-interface (i.e. a direct access unit DAU) and asks for the IP-address of the direct access unit DAU. If the gateway MSC GMSC returns information to the exchange G-EX that the MSC currently serving the mobile station MS has no IP-interface and thus no IP-address, the call is now being set up as a normal call from the internet telephone WS to the PSTN and then to the MSC currently serving the mobile station MS.

Step ST 4

The gateway MSC GMSC asks the mobile switching center MSC to provide a roaming number for the mobile station MS and an IP-address of the MSC.

Step ST 5

The mobile switching center MSC reserves a roaming number "01734" and waits for an IP-connection.

Step ST 6

The GMSC returns the data back to the PSTN exchange G-EX, namely the data about the IP-address "127.0.0.0".

Step ST 7

The PSTN exchange G-EX returns the data to the internet-PSTN gateway IG.

Step ST 8

The internet-PSTN gateway IG returns the IP-address to the second subscriber station WS.

Step ST 9

The workstation WS makes a connection to the IP-address of the mobile switching center and a call is set up to the mobile station "01734" using the H.245 protocol for control signalling and transferring audio data using GSM speech coding on H.323.

Step ST 10

The mobile switching center MSC receives a call via the direct access unit DAU and when it realizes a call pending at the direct access unit DAU, it immediately switches off the audio data encoding/decoding in the base station controller BSC. Then the call is being set up to the mobile station MS having the roaming number "01734".

Therefore, in FIG. 5, the gateway exchange G-EX as well as the GMSC negotiate before a call set-up whether or not the data can be routed directly through the internet to the IP-address of the mobile switching center. If the mobile switching center MSC realizes any call pending at its direct access unit DAU, then it can assume that no further audio data encoding/decoding is necessary in the base station controller BSC and therefore it switches off the encoding/decoding means thereof.

Call from a Workstation WS Connected to an IP-network via Internet and a PSTN to a Mobile Station MS FIG. 6 shows a configuration where the internet as well as the PSTN is used for setting up a call from a second subscriber station WS to a first subscriber station MS of the mobile radio communication network PLMN. This configuration may be seen analogous to FIG. 11.

The workstation WS contacts the gateway server IG using the IP-address or fully qualified domain name of this gateway server IG. In the call set-up message, the workstation WS includes the desired called telephone number of the mobile station MS as well as a parameter (information) indicating that the second subscriber station WS includes an audio data encoding/decoding means CODEC, namely that it is capable for GSM speech decoding/encoding. The gateway server IG then makes a normal call (PSTN-MS) using this called telephone number of the mobile station. It further sends information about the fact that the second subscriber station WS is capable of GSM speech decoding/encoding to the PSTN exchange and thus to the mobile switching center MSC of the PLMN where the mobile station MS is currently located.

Based on the information that the second subscriber station WS is capable of performing the GSM speech decoding/encoding, the MSC orders BSC to switch off its speech decoding/encoding for the duration of the call. During the call, the gateway server IG is switched to a through-state, i.e. it merely passes the data (the digitized coded speech) towards and from the workstation.

Therefore, in the case of FIG. 6, the MSC receives information regarding the fact that the second subscriber station WS is of a type having an own audio data encoding/decoding means through the internet, the gateway server IG and the public switched telephone network PSTN.

As is seen from the description of the embodiments in FIGS. 1 to 6, the mobile switching center MSC can always safely assume that the first subscriber station MS (i.e. a mobile station) comprises its own audio data encoding/decoding means. However, independently as to whether the workstation of the IP-network is called by the MS or whether the workstation WS itself initiates the call, the subscriber station type determining means SSTDM within the MSC receives information about the fact whether or not the second subscriber station is one that supports an independent GSM speech coding/decoding means. MSC can directly receive such information from a memory means, from the PSTN or merely by the fact that a call is pending at its direct access unit DAU. In all cases, it then switches off the speech coding/decoding in the BSC. Merely depending on the network configuration, the call is then routed through the internet or the conventional PSTN whilst the speech encoding/decoding in the BSC remains switched off (i.e. in its second operation state).

INDUSTRIAL APPLICABILITY

As explained above, the inventive method, switching means and telecommunication system is applicable to all network configurations where a mobile radio communication system interacts with a data network (such as IP-network) to which a number of workstations are connected which are capable of running an internet telephone software/hardware. The interconnection and the call set-up and the data communication may be performed through the PSTN or through internet depending on the subscriptions of the first and second subscriber stations to each of the network. Although the speech encoding/decoding has been described above with reference to GSM speech coding/decoding like in a D1, D2 or e-plus mobile radio communication networks existing in Germany, the above teaching is generally applicable to all situations where a mobile radio communication network interacts through a PSTN or internet with computers running a telephone software. Therefore, GSM is only an example here.

It is evident that on the basis of the teachings disclosed herein, various modifications and variations can be carried out by a skilled person and that the invention is therefore not restricted to any particular embodiment or example described herein. In particular, the embodiments of the invention can comprise features which are combinations from separately listed features in the claims and in the description. It should further be noted that the above description only refers to what is currently considered to be the best mode of the invention. Therefore, all variations and modifications are intended to fall within the scope of protection as defined in the claims.

Reference numerals in the claims only serve illustration purposes and do not limit the scope of protection of these claims.

What is claimed is:

1. A method for performing data communications between a first subscriber station of a mobile radio communication network and a second subscriber station connectable to the mobile radio communication network, wherein at least the first subscriber station includes an audio data encoding/decoding means, comprising the following steps:

a) sending a call set-up message from the first or second subscriber station to a switching means of the mobile radio communication network to set up a call between the first and second subscriber stations;

b) determining on the basis of said call set-up message whether the second subscriber station is of a type also including an audio data encoding/decoding means, said determining step including:

b1) accessing, by the switching means, an internal memory containing calling numbers, associated Internet Protocol (IP) addresses, and IP user names for subscriber stations in the network; and b2) comparing a calling number for the second subscriber station with the calling numbers, IP-addresses, and IP user names stored in the memory to determine whether the second subscriber station is of a type also including an audio data encoding/decoding means;

c) setting up a call between the first and second subscriber station;

d) switching off an audio data encoding/decoding means in said switching means, if the second subscriber station also includes an audio data encoding/decoding means; and e) encoding/decoding audio data at the first and second subscriber station using the respective encoding/decoding means and communicating said coded audio data through said switching means without applying an audio data coding/decoding thereto in said switching means.

2. The method according to claim 1, wherein the mobile radio communication network is compatible with the Global System for Mobile Communications (GSM), and the audio data is GSM-coded speech data.

3. A switch in a mobile radio communication network for communicating data between a first subscriber station of the mobile radio communication network and a second subscriber station connectable to the mobile radio communication network, wherein at least the first subscriber station includes a first audio data encoder/decoder, said switch comprising:

a) a second audio data encoder/decoder having a first operable state in which digital audio data received from the first/second subscriber station is encoded/decoded, and a second operable state in which digital audio data received from the first/second subscriber station is passed through the switch without encoding/decoding;

b) means for determining whether the second subscriber station is of a type having an audio data encoder/decoder, said determining means comprising:

b1) an internal memory for storing calling numbers, associated IP-addresses, and IP-user names for subscriber stations; and b2) means for comparing entries in the memory with a calling number of the second subscriber station to determine whether the second subscriber station is a station having an audio data encoder/decoder, said calling number of the second subscriber station being included in a call set-up message sent from the first or second subscriber station; and c) a controller that switches the second audio data encoder/decoder in the switch to the second operable state when the second subscriber station is determined to be of a type having an audio data encoder/decoder.

4. The switch according to claim 3, wherein the second subscriber station is connected to an intranet, said intranet being connected to said mobile radio communication network via the Internet.

5. The switch according to claim 3, wherein the second subscriber station is connected to an intranet, said intranet being connected to said mobile radio communication network via the Internet and via a public switched telephone network.

6. The switch according to claim 3, wherein the mobile radio communication network is compatible with the Global System for Mobile Communications (GSM), and the audio data is GSM-coded speech data.

7. A telecommunication system comprising:

a) a mobile radio communication network to which a first subscriber station and a second subscriber station are connected, at least one of said first and second subscriber stations having an audio data encoder/decoder, said network including a switch for communicating data between the first and second subscriber stations, said switch comprising:

a1) an audio data encoder/decoder having a first operable state in which digital audio data received from the first or second subscriber station is encoded/decoded, and a second operable state in which digital audio data received from the first or second subscriber station is passed through the switch without encoding/decoding;

a2) means for determining whether the second subscriber station is of a type having an audio data encoder/decoder, said type determining means comprising:

a21) an internal memory for storing calling numbers, associated IP-addresses, and IP-user names for subscriber stations; and a22) means for comparing entries in the memory with a calling number of the second subscriber station to determine whether the second subscriber station is a station having an audio data encoder/decoder, said calling number of the second subscriber station being included in a call set-up message sent from the first or second subscriber station; and a3) control means for switching the audio data encoder/decoder in the switch to the second operable state when the second subscriber station is determined to be of the type having an audio data encoder/decoder; and b) an intranet to which at least the second subscriber station is connected, said intranet being connected to the mobile radio communication network via the Internet and/or a public switched telephone network.

8. The telecommunication system according to claim 7, wherein the mobile radio communication network is compatible with the Global System for Mobile Communications (GSM), and the audio data is GSM-coded speech data.

9. A method for performing data communications between a first subscriber station of a mobile radio communication network and a second subscriber station connectable to the mobile radio communication network, wherein at least the first subscriber station includes an audio data encoding/decoding means, comprising the following steps:

a) sending a call set-up message from the first or second subscriber station to a switching means of the mobile radio communication network to set up a call between the first and second subscriber stations;

b) determining on the basis of said call set-up message whether the second subscriber station is of a type also including an audio data encoding/decoding means;

c) setting up a call between the first and second subscriber station;

d) switching off an audio data encoding/decoding means in said switching means, if the second subscriber station also includes an audio data encoding/decoding means; and e) encoding/decoding audio data at the first and second subscriber station using the respective encoding/decoding means and communicating said coded audio data through said switching means without applying an audio data coding/decoding thereto in said switching means;

f) wherein the second subscriber station is connected to an intranet, said intranet being connected to said mobile radio communication network via the Internet and via a public switched telephone network; and g) wherein when said call set-up message is sent from the first subscriber station, said switching means sends an enquiry message to a gateway exchange of said public switched telephone network in order to determine whether the second subscriber station is a station including said audio data encoding/decoding means and being connected to an intranet supporting an IP-network.

10. The method according to claim 9, further comprising sending by the switching means, an enquiry message to said gateway exchange in order to determine whether said call is to be routed through said public switched telephone network or through a direct access unit of said switching means and the Internet to said intranet.

11. A method for performing data communications between a first subscriber station of a mobile radio communication network and a second subscriber station connectable to the mobile radio communication network, wherein at least the first subscriber station includes an audio data encoding/decoding means, comprising the following steps:

a) sending a call set-up message from the first or second subscriber station to a switching means of the mobile radio communication network to set up a call between the first and second subscriber stations;

b) determining on the basis of said call set-up message whether the second subscriber station is of a type also including an audio data encoding/decoding means;

c) setting up a call between the first and second subscriber station;

d) switching off an audio data encoding/decoding means in said switching means, if the second subscriber station also includes an audio data encoding/decoding means; and e) encoding/decoding audio data at the first and second subscriber station using the respective encoding/decoding means and communicating said coded audio data through said switching means without applying an audio data coding/decoding thereto in said switching means; and f) wherein the second subscriber station is connected to an intranet, said intranet being connected to said mobile radio communication network via the Internet and via a public switched telephone network; and g) wherein when said call set-up message is sent from a second subscriber station having an audio data encoding/decoding means, a gateway server compares a calling number of the first subscriber station with entries in a second memory means which is connected to said gateway server and contains calling numbers and an associated IP-address of a direct access unit of said switching means in order to determine whether the first subscriber station belongs to a switching means having a switchable audio data encoding/decoding means.

12. The method according to claim 11, further comprising returning by the gateway server, the IP-address of the direct access unit to the second subscriber station, wherein the second subscriber station directly connects to the direct access unit via said IP-address.

13. A switching means of a mobile radio communication network for communicating data between a first subscriber station of the mobile radio communication network and a second subscriber station connectable to the mobile radio communication network, wherein the first subscriber station includes a first audio data encoding/decoding means, comprising:

a) a second audio data encoding/decoding means having a first operable state in which digital audio data received from the first/second subscriber station is encoded/decoded, and a second operable state in which digital audio data received from the first/second subscriber station is passed through the switch without encoding/decoding;

b) subscriber station type determining means for determining whether the second subscriber station is of a type including an audio data encoding/decoding means on the basis of a call-set-up message sent from the first or second subscriber station during a call set-up phase;

c) control means for switching said audio data encoding/decoding means of said switching means to said second operable state when said subscriber station type determining means determines that the second subscriber station is of a type including an audio data encoding/decoding means;

d) wherein the second subscriber station is connected to an intranet, said intranet being connected to said mobile radio communication network via the Internet and via a public switched telephone network; and e) first enquiry means are provided for sending an enquiry message to a gateway exchange of said public switched telephone network in order to determine whether the second subscriber station is a station including said audio data encoding/decoding means and being connected to an intranet supporting an IP-network.

14. The switching means according to claim 13, further comprising second enquiry means for sending an enquiry message to said gateway exchange in order to determine whether said call is to be routed through said public switched telephone network or through a direct access unit of said switching means and the Internet to said intranet.

15. A telecommunication system comprising:

a) a mobile radio communication network to which at least one first subscriber station having an audio data encoding/decoding means is connected;

b) an intranet to which at least one second subscriber station is connected;

c) an Internet and/or a public switched telephone network connected between the mobile radio communication network and the intranet;

d) wherein the mobile radio communication network includes a switching means for communicating data between a first subscriber station and a second subscriber station, comprising:

d1) an audio data encoding/decoding means having a first operable state in which digital audio data received from the first/second subscriber station is encoded/decoded, and a second operable state in which digital audio data received from the first/second subscriber station is passed through the switching means without encoding/decoding;

d2) subscriber station type determining means for determining whether the second subscriber station is of a type having an audio data encoding/decoding means on the basis of a call-set-up message sent from the first or second subscriber station during a call set-up phase; and d3) control means for switching said audio data encoding/decoding means of the switching means to the second operable state when said subscriber station type determining means determines that the second subscriber station is of a type having an audio data encoding/decoding means;

e) wherein said intranet is connected to said mobile radio communication network via the Internet and via a public switched telephone network separately;

f) wherein said switching means further comprises first enquiry means for sending an enquiry message to a gateway exchange of said public switched telephone network in order to determine whether the second subscriber station is a station having said audio data encoding/decoding means and being connected to an Intranet supporting an IP-network.

16. The telecommunication system according to claim 15, wherein said switching means includes second enquiry means for sending an enquiry message to said gateway exchange in order to determine whether said call is to be routed through said public switched telephone network or through a direct access unit of said switching means/and the Internet to said intranet.

17. An exchange in a mobile radio communication network for communicating data between a first subscriber station of the mobile radio communication network and a second subscriber station connectable to the mobile radio communication network, wherein at least the first subscriber station includes a first audio data encoder/decoder said exchange comprising:

a) a second audio data encoder/decoder having a first operable state in which digital audio data received from the first/second subscriber station is encoded/decoded, and a second operable state in which digital audio data received from the first/second subscriber station is passed through the exchange without encoding/decoding;

b) a subscriber station type determiner for determining whether the second subscriber station is of a type having an audio data encoder/decoder, said determiner comprising.

b1) an internal memory for storing calling numbers, associated IP-addresses, and IP-user names for subscriber stations; and b2) means for comparing entries in the memory with a calling number of the second subscriber station to determine whether the second subscriber station is a station having an audio data encoder/decoder, said calling number of the second subscriber station being included in a call set-up message sent from the first or second subscriber station; and c) a controller that switches the second audio data encoder/decoder in the exchange to the second operable state when the second subscriber station is determined to be of a type having an audio data encoder/decoder.

* * * * *